N. Webster,
Weeding Tool.
Nº 76,011 — Patented Mar. 24, 1868
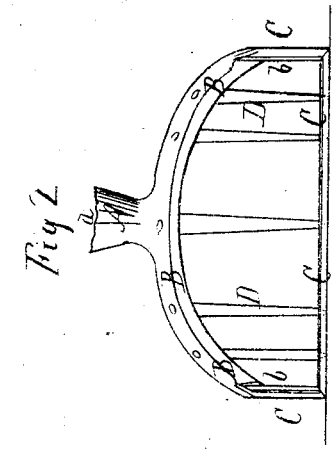
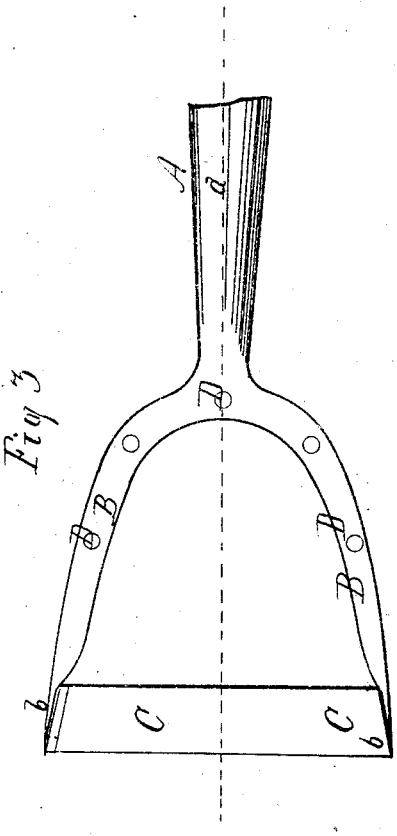
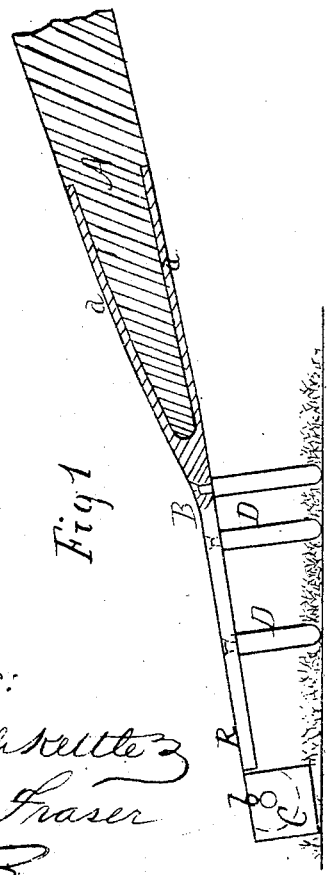
Witnesses:
H. C. Ashketter
J. A. Fraser
Inventor:
N. Webster
per Munn & Co.
Attorneys

United States Patent Office.

NELSON WEBSTER, OF PLAINFIELD, NEW JERSEY.

*Letters Patent No. 76,011, dated March 24, 1868.*

IMPROVEMENT IN WEEDING-TOOL.

*The Schedule referred to in these Letters Patent and making part of the same.*

TO ALL WHOM IT MAY CONCERN:

Be it known that I, NELSON WEBSTER, of Plainfield, in the county of Union, and State of New Jersey, have invented a new and improved Weeding-Tool; and I do hereby declare that the following is a full, clear, and exact description thereof, which will enable those skilled in the art to make and use the same, reference being had to the accompanying drawings forming part of this specification.

Figure 1 represents a side view, partly in section, of my improved weeding-tool.

Figure 2 is a front elevation of the same.

Figure 3 is a plan or top view of the same.

Similar letters of reference indicate corresponding parts.

This invention relates to a new shuffling-hoe, which is particularly intended for weeding purposes, and for cleaning walks, &c.

The invention consists chiefly in combining a hoe with a rake in such a manner that when the hoe is pushed forward through the weeds, the teeth of the rake will separate and sever the weeds, so that they will be made thoroughly innoxious.

The invention also consists in bending up the ends of the hoe, so as to get upright cutting-edges at the ends of the tool, for trimming walks and other purposes.

The invention also consists in making the teeth of the rake, which are fitted in a curved plate that is attached to the handle, higher towards the rear, so that the frame or bow of the tool will stand in a cant, allowing the handle to be nearly a continuation of the frame. Thereby the angle, generally produced at the junction of the handle with the frame, is either wholly dispensed with, or at least so materially reduced, that the full power exerted on the handle will be transferred to the tool.

The invention finally consists in so placing the teeth of the rake on the bow that the more in front the closer will they be together in a lateral direction, and the more to the rear the further will they be apart.

The object of this arrangement is to bring the longer weeds into more frequent contact with the teeth at places which are less far distant from each other than is necessary for shorter weeds, which are suffered to pass freely out between the teeth.

A, in the drawing, represents the handle of my improved weeding-tool. B is the bow or frame, to which the hoe and the teeth are secured. The same is connected in suitable manner with the handle A, either by means of a socket, $a$, projecting from the bow, as shown, or otherwise. C represents the cutting-tool. The same is a metal plate, with sharpened front edge, and with upturned ends $b$ $b$, as shown, the said upright ends being riveted or otherwise secured to the ends of the bow B, as is clearly shown in fig. 2.

It will be seen that with the upright cutting-edges $b$ $b$ at the ends, the tool can be profitably employed for trimming the lining of walks, and for other similar purposes.

D D are the teeth of the rake. The same are fitted into the under side of the bow B, and are arranged a suitable distance apart.

I prefer to have the teeth made longer towards the rear, as in fig. 1, so as to bring the plate B on a cant to decrease the angle formed by the handle with the frame. I also prefer to so arrange the teeth on the bow, that the further they are in the front the nearer will they be together in a lateral direction, that is to say, if lines are drawn through the teeth parallel with the axis of the handle A, the lines passing through the front teeth will be nearer to those next behind than the latter are to those further back, and so forth, the rear teeth being furthest apart, for the purposes hereinbefore set forth.

I claim as new, and desire to secure by Letters Patent—

1. The shuffling-hoe and rake, constructed as described, consisting of the cutter C, provided with upturned cutting-ends $d$, and secured to the bow B carrying the teeth D, as herein shown and described, for the purpose specified.

2. Making the teeth of the rake, when they are fitted into a bow, B, longer towards the rear, substantially as and for the purpose herein shown and described.

NELSON WEBSTER.

Witnesses:
 JAMES M. DUNN,
 STEPHEN O. STAATS.